Patented Feb. 24, 1948

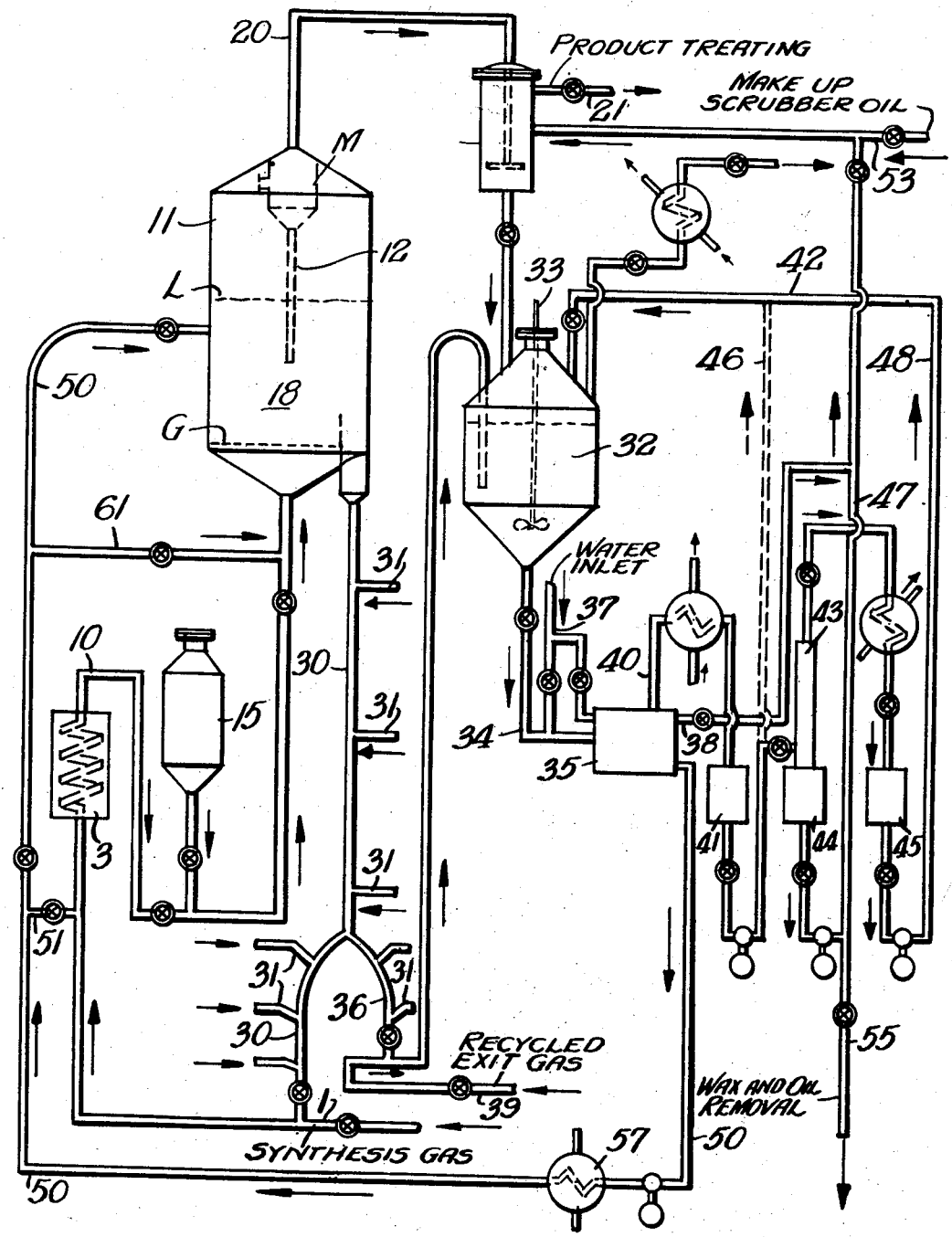

2,436,568

UNITED STATES PATENT OFFICE 2,436,568

HYDROCARBON SYNTHESIS

Lindsay I. Griffin, Baton Rouge, La., and Charles E. Jahnig, Roselle, N. J., assignors to Standard Oil Development Company, a corporation of Delaware Application September 19, 1946, Serial No. 697,976

8 Claims. (Cl. 260—449.6)

1

The novel features of our invention are fully disclosed in the following specification and claims, considered in connection with the accompany drawing.

The catalytic synthesis of hydrocarbons, including those boiling in the gasoline and gas oil boiling range, from CO and hydrogen as starting materials is a matter of record. Experience with this process has shown that two general types of catalysts are useful in this process; namely, (1) metallic cobalt or nickel containing a minor amount of thoria, and (2) sintered iron. Usually the said cobalt is supported on a carrier such as kieselguhr, and furthermore, instead of using thoria as a promoter, magnesia may be employed for this purpose. Sometimes, a combination of thoria and magnesia is used as promoter in connection with the cobalt. A catalyst having the following composition has been found to give good results; namely, 32 weight per cent metallic cobalt, 5 weight per cent thoria, and the balance the support, kieselguhr.

The reaction between CO and hydrogen in the presence of one of the aforementioned catalysts results in the formation of normally gaseous hydrocarbons, hydrocarbons boiling in the gas oil boiling range and heavier material. The heavier material which is formed in the reaction includes normally solid waxes, which with the heavier oils impair the activity of the catalyst and, therefore, there comes a time when the catalysts must be treated to remove these adsorbed compounds. In a stationary bed type of operation it will be necessary, of course, to discontinue the productive phase to wash the catalyst and free the same of the waxy and oily contaminants. But in the so-called "fluid" catalyst operation, which will be discussed and described more fully hereinafter, and to which a preferred embodiment of my invention is particularly adaptable, the fouled catalyst may be withdrawn from the reaction zone and washed according to a method which represents my present invention.

In the accompanying drawing I have shown diagrammatically a form of arrangement of apparatus elements in which a preferred modification of my invention may be carried into practical effect.

Referring in detail to the drawing, 1 represents a synthesis gas charging line containing a mixture of CO and H₂, properly proportioned, which mixture is thereafter mixed with recycled catalyst from a standpipe 30 in communication with a reactor 18, all of which will appear more fully hereinafter, and thence forced through a heat

2 exchanger 3 wherein it is cooled (or heated). The synthesis gas and catalyst are then withdrawn from heat exchanger 3 through line 10 and mixed with "makeup" catalyst which is withdrawn from a supply hopper 15. This suspension is then conveyed to a reaction vessel 18 where it flows upwardly therein through a screen member G. In some cases cooler 3 can be omitted and cooling accomplished by direct or indirect heat exchange within the fluid bed of the reactor. In this case, the synthesis feed gas can be introduced directly into the bottom of the reactor. The catalyst is maintained in the fluid state previously referred to by maintaining the velocity within the limits of 0.1 to 5 feet per second, preferably at an inlet velocity greater than 0.2 foot per second and an exit velocity less than 2.0 feet per second when the catalyst has a particle size from 0 to 200 microns, with over 50 per cent in the 40 to 80 micron particle size range and the pressure is close to atmospheric. Depending on the amount of catalyst charged to the reactor 18 there will be a dense turbulent suspension of catalyst in gas having an upper level at L. This suspension between the limits of G and L will weigh from about 5 to 90 pounds per cubic foot usually from 10 to 75 pounds per cubic foot. Above L in the reactor there is a disengaging space 11 in which the density of the materials is much lower than that between L and G due to the fact that catalyst separates from gasiform material by gravity in this region. This disengaging space 11, which may be from 10 to 15 feet in height, is determined by the amount of catalyst in the reactor during the process and the gas or vapor velocity. Usually there is disposed in the upper portion of the reactor a plurality of catalyst separating devices M (one shown) adapted to cause the separation of catalyst fines from gases or vapors, forced therethrough and the return of the separated catalyst to the main bulk thereof between L and G via one or more "dip" pipes 12. These solid separating devices are preferably the so-called "cyclone" separators or, in other words, devices which serve to separate solids from gases by centrifugal force. The gaseous product stream finally issuing from reactor 18 through line 20 is substantially free of catalyst, but in order to insure complete removal of any entrained fines which still persist therein, the stream is passed through one or more washers or scrubbers S where the vapors are treated with a heavy oil. The gaseous product issuing from the scrubber S is then delivered to refining treatment such as distillation, reforming of naphtha content, catalytic cracking of gas oil components and the like and a receiver, all of which I have indicated by 21, but which I will not describe in detail because the expert will understand what is intended, and furthermore because the purification and improvement of the products formed in the reaction zone do not go to the heart of my invention.

Referring to the reaction zone operating conditions, the following give good results:

Broad range

| Catalyst Type | Co or Ni (promoted and on carrier) | Fe |
| --- | --- | --- |
| Temperature, °F | 325–550 | 375–700 |
| Pressure, atmos | 1–5 | 1–50 |
| Feed Rate, v./v./Hr | 100–3000 | 100–3000 |

Preferred Range

| Catalyst | Co or Ni (promoted and on carrier) | Fe |
| --- | --- | --- |
| Temperature, °F | 375–475 | 475–625 |
| Pressure, atmos | 1–35 | 1–35 |
| Feed Rate, v./v./Hr | 300–1000 | 300–1000 |

Referring to the catalyst in reactor 18 the same is continuously withdrawn through a standpipe 30 into which fluidizing gas is introduced through inlet lines 31 conveniently placed along standpipe 30. The major part of the catalyst withdrawn through the standpipe 30 (over 95%) is recycled through the heat exchanger 3 to the reactor in order to control the reactor temperature. Since the reaction taking place in 18 is exothermic, it will be necessary to withdraw heat and ordinarily the catalyst should be cooled to a temperature say from 300 to 500° F. in heat exchanger 3 before it is returned to the reactor. The temperature to which the catalyst should be cooled will depend upon the temperature maintained in reactor 18. The remainder of the catalyst stream is withdrawn from standpipe 30 through line 36, mixed with carrier gas which may be recycled exit gas introduced via line 39, and discharged into the catalyst washer 32 provided with a suitable agitating means 33 where it is mixed with a hydrocarbon, such as a mixture of butane, propane, and pentane, or any of these in a liquefied form or any heavier naphtha. Other solvents not miscible with water may be used, such as benzene, toluene, or naphtha which may or may not be produced in the process. If preferred, the catalyst from standpipe 36 may be introduced directly into washing zone 32, without first suspending it in a carrier gas. The waxy and oily constituents contained on the catalyst are dissolved in the solvent contained in the mixing vessel 32. A slurry of solvent and catalyst is withdrawn from 32 through a pipe 34 and discharged into a vessel 35 where it is permitted to remain in a more or less quiescent state after it has been admixed with water introduced through line 37, this water preferably being preheated. The washing process (in mixer 32) is preferably carried out at superatmospheric temperatures, for example, a temperature corresponding to 15 pounds per square inch steam gauge pressure. It is preferable to provide two or more of the settling zones 35 so that while one is filled with the surry of the catalyst in solvent and water, a second tank may be filling with the material flowing in through line 34. In the settling zone 35 stratification between the water and hydrocarbons occurs when a solvent of low volatility (such as toluene) is employed, and the catalyst passes into the water phase. The solvent is withdrawn as a liquid phase through line 40 and accumulated in a receiver 41. When using a product stream as solvent, the solvent containing wax may be introduced to the product fractionator to effect purification. However, where an extraneous non-volatile solvent is used, the material from settler 35 is accumulated in receiver 41 from which it may be pumped to a fractionating column 43. In the event a volatile solvent (propane, butane, etc.) is used to dissolve the waxy constituents from the catalyst, this solvent is vaporized on being contacted with the hot water and/or steam, say, at 100° to 350° F. in mixer 35, and will be collected in vessel 41. The oil or wax remaining after vaporization of the solvent will collect on the surface of the water contained in settler 35 and may be withdrawn by skimming via line 38. The oil recovered by skimming from 35 or from still pot 44 together with any scrubbing oil needer for makeup, is recycled to the oil scrubber S via line 47 to replace the oil slurry constantly withdrawn from this vessel, and admitted to the mixer 32. A portion of this recycle stream is bled off through line 55, and constitutes one of the products of the process. This material may be treated or processed as desired. Makeup scrubbing oil is added as required via line 53. The wax-free solvent collected in vessel 41 (or 45 depending upon whether a volatile or non-volatile solvent is employed) is recycled via line 46 (or 48) to vessel 32 to cleanse additional catalyst of its adsorbed wax. A water slurry containing the catalyst is withdrawn from settler 35 through line 50 and pumped back into the reaction zone 18 or via line 51 into the circulating catalyst stream ahead of heat exchanger 3. This stream may also be returned to the reactor inlet through line 6 if desired.

Evaporation in the reactor 18 of the water from the slurry tends to cool the reaction zone. The amount of this cooling depends on the temperature and amount of water returned. One purpose of this invention is to show how this heat removal, and hence reaction temperature, can be controlled. This control is accomplished by regulating the amount of water returned to the reaction zone, and also by using heat exchanger 57 to regulate the temperature and degree of vaporization of slurry return.

Now with respect to the catalyst supply hopper 15, it is obvious from the foregoing description that after the operation has been started, it will be necessary to feed catalyst from said hopper to the system only in such amounts as to make up for whatever catalyst may be lost from the system. The quantity of catalyst sent to the wash system is automatically controlled as is the solvent recycled to the agitator. The quantity of solvent needed for the solution of the wax is determined by the rate of wax production within the reactor and the degree of stripping that takes place therein. As an example, the slurry in the mixer 32 may contain between 0.2 and 2 pounds of catalyst per gallon of solvent. The slurry residence time required in the said mixer is determined by a number of factors such as degree of agitation, temperature and solvent characteristics; however, times varying between 5 minutes and 3 hours will usually be employed. The catalyst-water slurry leaving settler 35 via line 50 may contain from 0.1 to 3 pounds per gallon depending upon the amount of catalyst being returned and upon the amount of heat which it is desired to remove from reactor 18.

Numerous modifications of our invention may be made by those who are familiar with the art without departing from the spirit thereof.

What we claim is:

1. In the synthesis of hydrocarbons from carbon oxides and $H_2$ in the presence of a suitable catalyst, the improvement which comprises providing a catalyst suspended in a mixture of carbon oxides and $H_2$ gas in a reaction zone during a hydrocarbon synthesis reaction and maintaining the catalyst activity by withdrawing catalyst containing a waxy contaminant, washing said withdrawn catalyst with a solvent for the said waxy contaminant in a washing zone, discharging a slurry of catalyst and solvent withdrawn from said washing zone into a settling zone, adding water to said last-named zone, permitting stratification to occur in said last-named zone and permitting the washed catalyst to enter the water phase, and returning the purified catalyst in the form of a water slurry to the reaction zone.

2. The method of claim 1 in which contaminated catalyst is washed with a light hydrocarbon oil.

3. In the synthesis of hydrocarbons from carbon oxides and $H_2$ in the presence of a suitable catalyst, the improvement which comprises providing a catalyst suspended in a mixture of carbon oxide and $H_2$ gas in a reaction zone during a hydrocarbon synthesis reaction and maintaining the catalyst activity by withdrawing catalyst containing a waxy contaminant, washing said withdrawn catalyst with a solvent for the said waxy contaminant in a washing zone, discharging a slurry of catalyst and solvent withdrawn from the washing zone into a settling zone, adding heated water to said last named zone whereby the solvent is vaporized and withdrawn from said last-named zone, removing waxy contaminants by skimming from the surface of the water the catalyst mixing with the water to form a slurry therewith and returning the thus-purified catalyst in the form of the said slurry to the reaction zone.

4. The method set forth in claim 3 in which the solvent is a normally gaseous hydrocarbon.

5. The method set forth in claim 1 in which the water slurry is fed directly to the reaction zone at a rate responsive to the temperatures existing in said reaction zone and thus utilizing the said water to cool the reaction zone and control the temperature therein.

6. The method set forth in claim 3 in which the water slurry is fed directly to the reaction zone at a rate responsive to the temperatures existing in said reaction zone and thus utilizing the said water to cool the reaction zone and control the temperature therein.

7. The method set forth in claim 1 in which the water slurry is preheated before discharge into the reaction zone, to a degree responsive to temperature conditions in said reaction zone, thereby controlling the reaction temperature.

8. The method set forth in claim 3 in which the water slurry is preheated before discharge into the reaction zone to a degree responsive to temperature conditions in said reaction zone thereby controlling reaction temperature.

LINDSAY I. GRIFFIN.
CHARLES E. JAHNIG.

REFERENCES CITED

The following references are of record in the file of this patent:

UNITED STATES PATENTS

| Number | Name | Date |
|---|---|---|
| 2,309,034 | Barr | Jan. 19, 1943 |
| 2,384,967 | Schumacher et al. | Sept. 18, 1945 |

FOREIGN PATENTS

| Number | Country | Date |
|---|---|---|
| 516,160 | Great Britain | Dec. 22, 1939 |